Figure 1:
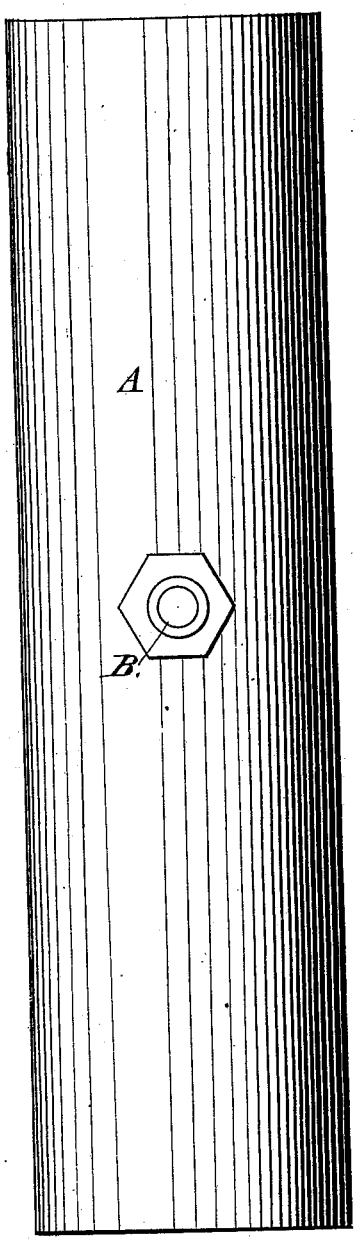
Figure 2:
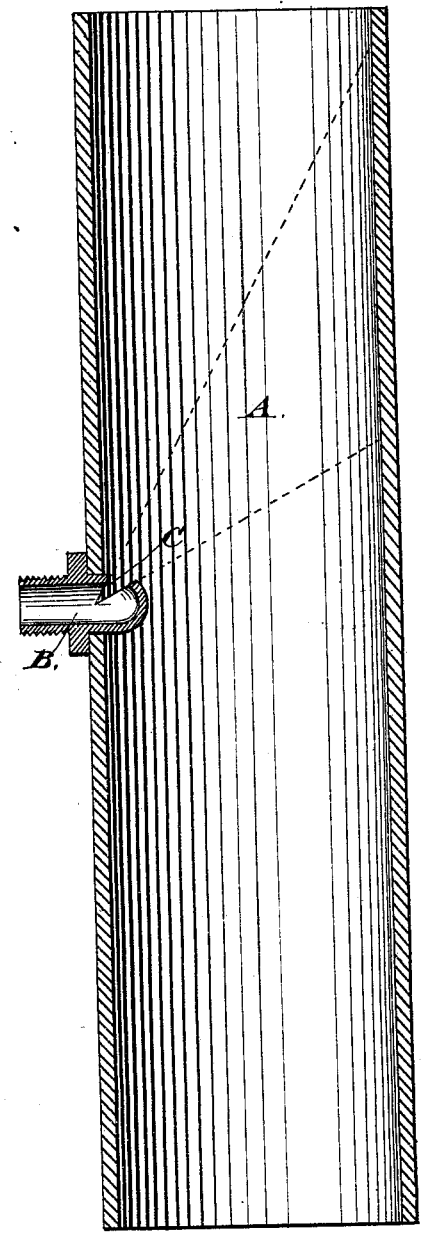

T. R. CROOKS.
Condenser.

No. 208,717. Patented Oct. 8, 1878.

Witnesses:
W. W. Dougherty.
R. F. Cahill.

Inventor:
Thomas R Crooks

UNITED STATES PATENT OFFICE.

THOMAS R. CROOKS, OF PHILADELPHIA, PENNSYLVANIA, ASSIGNOR OF TWO-THIRDS HIS RIGHT TO HARRY N. EVANS AND CHARLES C. WILSON, OF SAME PLACE.

IMPROVEMENT IN CONDENSERS.

Specification forming part of Letters Patent No. 208,717, dated October 8, 1878; application filed September 12, 1878.

*To all whom it may concern:*

Be it known that I, THOMAS R. CROOKS, of the city of Philadelphia, in the county of Philadelphia and State of Pennsylvania, have invented a new and useful Improvement in Condensers for Steam-Engines, of which the following is a specification:

This invention, which relates to that class of devices employed for condensing the exhaust-steam from engines, consists in the introduction of a solid sheet of water, either cold or hot, into the exhaust-pipe of any steam-engine by means of a small slotted nozzle or nipple, of iron or other suitable material, having a V-slot cut diagonally across the head of the nozzle or nipple, rounded on the inside, which produces a fan-shaped solid sheet of water, filling the whole space in the exhaust-pipe, thus entirely preventing the escape-steam from passing except through the sheet of water, the contact with which produces the desired effect. The slot being diagonal, the nozzle or nipple can be arranged so as to cause the flow of water to go across the exhaust-pipe upward or downward. The nozzle or nipple is screwed into the exhaust-pipe at the desired point, and the connecting or feed pipe may lead from the engine-pump or any other source of feed having sufficient power to force the water across the exhaust-pipe, and the condensed steam, escaping in the form of hot water of very high temperature, can empty into a tank, barrel, box, or any other receptacle of wood or metal, from which it may be fed into the exhaust-pipe over and over again, or be forced into the boiler at nearly boiling temperature, or used for mechanical or other purposes, or conveyed into any outlet for waste water.

The feed of water through the slotted nozzle can be regulated at will by means of an ordinary stop-cock at or near the junction of the nozzle and the feed-pipe.

The accompanying drawing, in which similar letters of reference indicate like parts, shows my device applied to the exhaust-pipe.

A A is the exhaust-pipe. B B is the slotted nozzle or nipple. C is the diagonal V-slot and rounded head, which produces the desired solid sheet of water, covering the whole space in the exhaust-pipe.

What I claim is—

The nozzle or nipple B, provided with a rounded head and a diagonal V-shaped slot, so as to introduce a solid sheet of water into the exhaust-pipe of an engine, arranged substantially as shown, and for the purpose specified.

THOMAS R. CROOKS.

Witnesses:
W. W. DOUGHERTY,
R. F. CAHILL.